(12) United States Patent
Weaver et al.

(10) Patent No.: US 12,385,396 B2
(45) Date of Patent: Aug. 12, 2025

(54) TENSION INDICATOR FOR A ROCK BOLT

(71) Applicants: SANDVIK MINING AND CONSTRUCTION TOOLS AB, Sandviken (SE); SANDVIK MINING AND CONSTRUCTION AUSTRALIA PTY LTD, Milton (AU)

(72) Inventors: Steven Weaver, Heatherbrae (AU); Osvaldo Vallati, Heatherbrae (AU); Mietek Rataj, Heatherbrae (AU)

(73) Assignees: Sandvik Mining and Construction Tools AB, Sandviken (SE); Sandvik Mining and Construction Australia Pty Ltd, Milton (AU)

( * ) Notice: Subject to any disclaimer, the term of this patent is extended or adjusted under 35 U.S.C. 154(b) by 240 days.

(21) Appl. No.: 17/924,208

(22) PCT Filed: May 12, 2021

(86) PCT No.: PCT/EP2021/062698
§ 371 (c)(1),
(2) Date: Nov. 9, 2022

(87) PCT Pub. No.: WO2021/228981
PCT Pub. Date: Nov. 18, 2021

(65) Prior Publication Data
US 2023/0175397 A1    Jun. 8, 2023

(30) Foreign Application Priority Data

May 14, 2020   (EP) ..................... 20174642

(51) Int. Cl.
*E21D 21/02*    (2006.01)
*F16B 31/02*    (2006.01)

(52) U.S. Cl.
CPC ............ *E21D 21/02* (2013.01); *F16B 31/028* (2013.01)

(58) Field of Classification Search
CPC ............................. F16B 31/028; E21D 21/02
See application file for complete search history.

(56) References Cited

U.S. PATENT DOCUMENTS

| | | | | |
|---|---|---|---|---|
| 3,021,747 | A | * 2/1962 | Garrett | ................ G01L 5/243 73/761 |
| 3,137,268 | A | 6/1964 | Hornwood | |
| 3,161,174 | A | 12/1964 | Harrison | |
| 3,948,141 | A | * 4/1976 | Shinjo | ................ F16B 31/028 73/761 |

(Continued)

FOREIGN PATENT DOCUMENTS

| | | |
|---|---|---|
| AU | 2010223134 B2 | 8/2012 |
| CZ | 25706 U1 | 7/2013 |

(Continued)

*Primary Examiner* — Janine M Kreck
(74) *Attorney, Agent, or Firm* — Corinne R. Gorski

(57) ABSTRACT

A tension indication device for a rock bolt includes a support washer, a cover member having a central hole for receiving a trailing portion of the rock bolt, and an indicator substance provided in a first space in the cover member or in a recess in the support washer for facing the nut. Upon rotation of the nut, indicator substance is forced out of the first space such that the indicator substance is visible at inspection of the rock bolt, thereby indicating that the rock bolt has been tensioned.

10 Claims, 1 Drawing Sheet

(56) References Cited

U.S. PATENT DOCUMENTS

| | | | |
|---|---|---|---|
| 4,000,681 A | 1/1977 | Coldren | |
| 4,149,446 A * | 4/1979 | Spengler | F16B 31/028 411/11 |
| 4,322,193 A * | 3/1982 | Stahl | F16B 31/028 29/505 |
| 9,970,472 B2 * | 5/2018 | Handa | F16B 31/028 |
| 2004/0200290 A1 * | 10/2004 | Almanstoetter | G01L 5/243 73/761 |
| 2009/0311066 A1 | 12/2009 | Utille | |

FOREIGN PATENT DOCUMENTS

| | | | |
|---|---|---|---|
| FR | 2955366 A1 | | 7/2011 |
| GB | 2499283 A | | 8/2013 |
| JP | 2005140314 A | * | 6/2005 |
| WO | 2017187219 A1 | | 11/2017 |

* cited by examiner

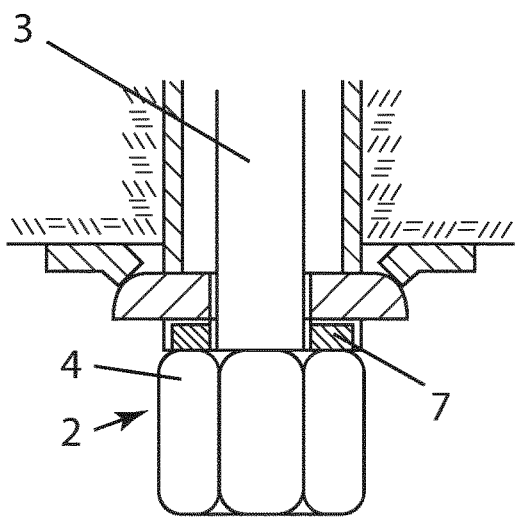
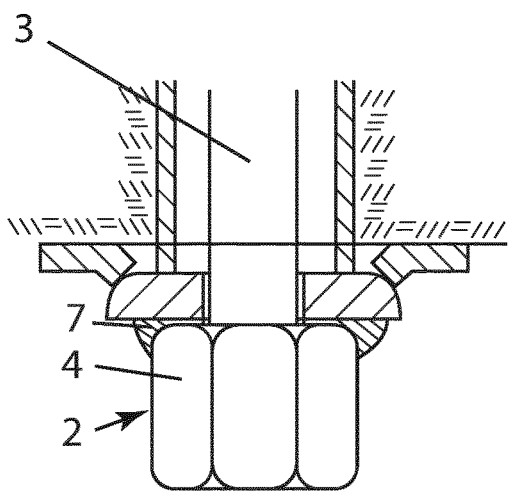
Fig. 1　　　　　　　　Fig. 2
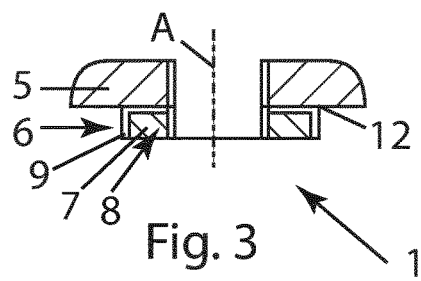
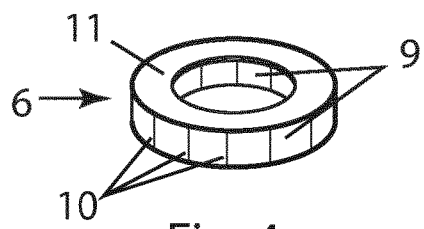
Fig. 3　　　　　　　　Fig. 4
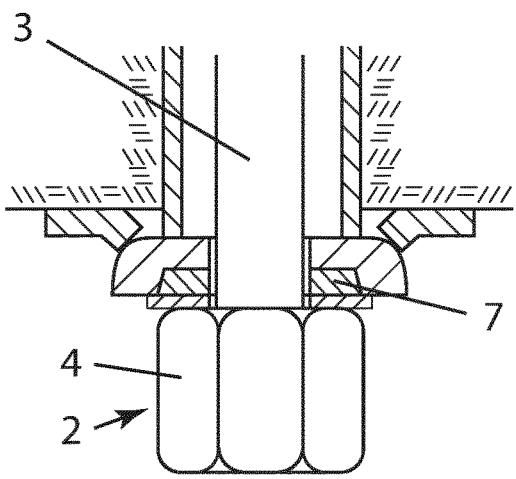
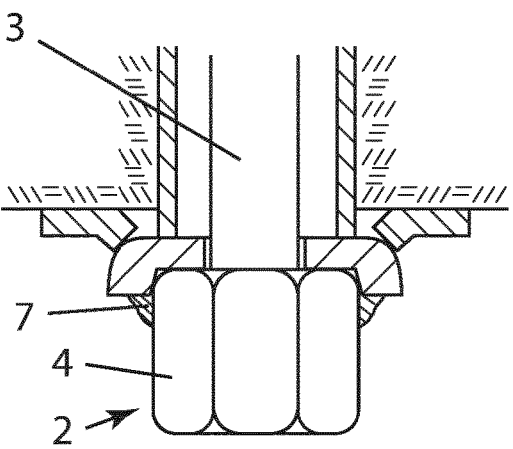
Fig. 5　　　　　　　　Fig. 6
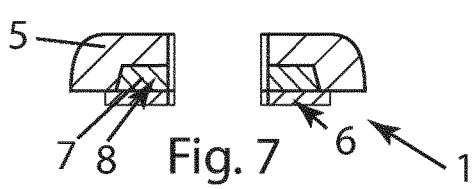
Fig. 7　　　　　　　　Fig. 8

TENSION INDICATOR FOR A ROCK BOLT

RELATED APPLICATION DATA

This application is a § 371 National Stage Application of PCT International Application No. PCT/EP2021/062698 filed May 12, 2021 claiming priority to EP 20174642.7 filed May 14, 2020.

TECHNICAL FIELD

The present disclosure relates to rock bolts for reinforcement of formations and specifically to technology for promoting correct installation of such bolts.

BACKGROUND

Formations, such as rock formations, are often reinforced using expandable rock bolts. For example, expandable rock bolts are commonly used for roof bolting in mining tunneling, and for stabilization of rock walls, slopes and dikes. Various types of rock bolts or anchors are used depending for example on the type of formation to be reinforced.

A common type of expandable bolt is the hydraulically expandable rock bolt commonly provided with an expandable body to be driven into a formation and thereafter expanded by introduction of a pressurized pressure medium such that the expandable body presses against the wall of the borehole to frictionally anchor the bolt within the formation and thereby reinforce the formation. A hydraulically expandable rock bolt is known from CZ 25706 U1. WO 2017/187219 A1 relates to improvements of hydraulically expandable rock bolts and teaches an indicator for the clamping of such a bolt.

Another type of expandable rock bolt is the mechanically expandable rock bolt such as the one of AU2010223134B2. Such a rock bolt is generally driven into a formation by an installation device such as a jumbo. The bolt comprises an elongate expandable outer body and a central rod extending inside the outer body from a trailing portion provided with a nut to a leading portion operatively connected to an expansion mechanism for expanding the outer body upon rotation of the central rod.

At installation of an expandable rock bolt in the formation, the jumbo is operated to repeatedly impact the outer body of the bolt, thereby forcing the outer body into the formation. When the bolt is sufficiently far driven into the formation the bolt is to be expanded by rotation of the nut, which causes rotation of the central rod such that the expansion mechanism causes expansion of the outer body. Typically, the nut is a blind nut such that the nut can first be screwed onto a thread at the outer portion of the central rod, wherein the central rod eventually bottoms out in the blind nut, thereby preventing further relative rotation between the central rod and the blind nut. This allows torque to be applied to the nut and further to the central rod for tensioning of the expansion mechanism of the bolt. Other means for preventing co-rotation between the central rod and nut are feasible, such as thread-locking fluid or a shearing pin, wherein a standard open nut is used instead of a blind nut.

Sometimes, the tensioning of the central rod is not high enough due to lower than required torque output of the installation equipment which means that the bolt has not been expanded and thus does not reinforce the formation as good as it would normally do if correctly tensioned. Manual inspection and tightening of a plurality of bolts in a formation is time-consuming and error-prone and faulty installation of the expandable rock bolts is dangerous since portions of the formation may unintentionally collapse.

In other words, tensioning of the bolt translates as a compressive force on the rock strata, which is advantageous as it discourages cracks from opening up in and between the rock strata, and as rock is brittle, stopping the first microcracks may stop cracking and damage to the rock. Additionally, in mechanically expanding bolts, tension in the central rod can only be generated against a moving wedge which is also expanding and ever more tightly gripping the rock, so the bolt will not slide out of the hole.

U.S. Pat. No. 3,161,174 teaches a tension indication device for an expandable rock bolt, but the technical solution is complex.

U.S. Pat. No. 4,000,681 teaches a tension indication device for an expandable rock bolt, but the technical solution is also complex.

Hence, there is a need for an improved means for promoting correct tensioning of rock bolts.

SUMMARY

According to a first aspect of the invention, the above-mentioned object is achieved by a tension indication device for a rock bolt, wherein the rock bolt includes a central rod with a trailing portion provided with a nut. The tension indication device includes a support washer provided with a central hole for receiving the trailing portion of the rock bolt. The tension indication device also includes a cover member with a central hole for receiving the trailing portion of the rock bolt. Further, the tension indication device includes an indicator substance provided in a first space.

According to a first embodiment called a), the first space is provided in the cover member and is radially outwards surrounded by a circumferential wall portion of the cover member extending about a central axis A of the tension indication device, wherein the circumferential wall portion is configured such that it is deformable by the nut upon tensioning of the central rod at rotation of the nut such that the nut at least partly enters the first space.

According to a second embodiment called b), the first space is provided in a recess in the support washer for facing the nut, wherein the cover member is configured to be fitted between the nut and the support washer and to normally cover the recess such that the indicator substance is not visible before tensioning of the central rod by rotation of the nut, wherein the first space is cylindrical and radially inwards open.

In use, the tension indication device is positioned on the trailing portion of the rod of the rock bolt with the cover member positioned between the support washer and the nut.

A tension indication device according to alternative a) works by forcing at least some of the indicator substance out of the first space and radially outwards past the circumferential wall portion upon said nut entering the first space.

A tensioning device according to alternative b) works by forcing at least some of the indicator substance out of the first space and radially outwards past upon said nut deforming the cover member and entering the first space. The cylindrical shape of the recess defining the first space and the fact that it is radially inwards open enables increased movement of the nut into the first space.

A tension indication device according to alternative a), may be configured with the circumferential wall portion comprising slits or weakened portions.

The slits or weakened portions promote controlled breaking of the circumferential wall upon deformation of the circumferential wall at tensioning of the central rod. The wall portion is thus forced radially outwards with respect to the central axis of the tension indication device upon tensioning of the central rod, wherein the indicator substance moves radially outwards such that it is visible after tensioning of the central rod by rotation of the nut.

The slits or weakened portions may extend along the central axis A of the tension indication device, from a ridge of the circumferential wall portion. Such orientation of the weakened portions or slits enable early and gradual break of the slits or weakened portions starting from the ridge. This provides a predictable deformation and breaking of the circumferential wall at tensioning of the central rod.

The circumferential wall may be attached to a disc-shaped base portion of the cover member, said base portion comprising the central hole.

The base portion thus extends around the bolt and keeps the circumferential wall centered and attached at tensioning of the central rod even if the nut deforms the circumferential portion. This promotes even spread of the indicator substance about the circumference of the tension indication device.

The base portion may be attached to the circumferential wall portion 9 at a longitudinal end portion of the circumferential wall with respect to the central axis A of the tension indication device.

Such positioning of the attachment of the circumferential wall to the base portion at the longitudinal end portion, as opposed to for example attachment midway along the longitudinal extent of the circumferential wall portion, increases the largest distance between the base portion and the free end portion of the circumferential wall and thereby enables the indicator substance to more easily deform and split the circumferential wall upon tensioning of the central rod.

When configured according to alternative b), the cover member may be a disc-shaped washer provided with the central hole.

For any of the above described embodiments, the indicator substance and the cover member may be differently colored, for example with the indicator substance being green and the cover member being red.

By giving the indicator substance a different color than the cover member, one can more easily spot the indicator substance being forced out of the first space as the nut is tensioned, which thus makes visual indication clearer.

The indicator substance may be made of thermoplastic, or plasticine or normally non-runny paste.

According to a second aspect, the above-mentioned object is achieved by a rock bolt system comprising a tension indication device as described above and comprising said rock bolt.

When the tension indication device is configured according to alternative b) described above, the outer diameter of the cylindrical first space may be configured large enough to allow the nut to move at least partly into the first space upon tensioning of the central rod.

This enables extrusion by said nut taking up some of the space in the first space.

The outer diameter of the cylindrical first space may be less than 5% larger than two times the maximum radial extent of the nut.

Such narrow spacing between the nut and the support washer promotes extrusion of the indicator substance as the nut enters the first space.

BRIEF DESCRIPTION OF DRAWINGS

FIGS. 1-4 all relate to a first embodiment of a tension indication device whereas FIGS. 5-8 all relate to a second embodiment of the tension indication device.

FIGS. 1, 2, 5 and 6 show the tension indication device together with a rock bolt.

Specifically, FIGS. 1 and 5 show the tension indication device before rotation of the nut for tensioning of the central rod of the rock bolt, whereas FIGS. 2 and 6 show the tension indication device after rotation of the nut and with the indicator substance thus visible.

FIG. 3 shows the tension indication device according to the first embodiment in isolation and FIG. 6 shows the tension indication device according to the second embodiment in isolation.

FIG. 4 is a perspective view showing the cover member used in the tension indication device according to the first embodiment whereas FIG. 8 is a perspective view showing the cover member used in the second embodiment of the tension indication device.

DETAILED DESCRIPTION

A tension indication device 1 for a rock bolt 2 according to a first embodiment will hereinafter be described with reference to the appended drawings. As shown in FIGS. 1-2, the tension indication device 1 is for a rock bolt 2 comprising a central rod 3 with a trailing portion provided with a nut 4. As shown in FIGS. 3-4, the tension indication device 1 comprises a support washer 5 made of a suitable material, such as steel. The support washer 5 is provided with a central hole for receiving the trailing portion of the rock bolt 2. The tension indication device 1 also comprises a cover member 6 with a central hole for receiving the trailing portion of the rock bolt 2. Further, the tension indication device 1 comprises an indicator substance 7 provided in a first space 8. The first space 8 is provided in the cover member 6 and is radially outwards surrounded by a circumferential wall portion 9 of the cover member 6 extending about a central axis A of the tension indication device 1. The circumferential wall portion 9 is configured such that it is deformable by the nut 4 upon tensioning of the central rod 3 at rotation of the nut 4. Making the circumferential wall portion 9 deformable by the nut 4 is mainly a matter of choosing an appropriate material for the cover member 6 and dimensioning its wall thickness to deform at a desired tension in the central rod 3. The idea is that at desired tension of the central rod 3, the nut 4 at least partly enters the first space 8 upon tensioning of the central rod 3.

In use, the tension indication device 1 is positioned on the trailing portion of the rod of the rock bolt 2 with the cover member 6 positioned between the support washer 5 and the nut 4.

Upon rotation of the nut 4 for tensioning of the central rod 3, at least some of the indicator substance 7 is forced out of the first space 8 and radially outwards past the circumferential wall portion 9 as the nut 4 enters the first space 8. The indicator substance 7 is thus visible for a person inspecting the rock bolt 2 installation and the presence of visible indicator substance 7 indicates that the bolt has been properly tensioned.

The circumferential wall portion 9 comprises slits or weakened portions 10. The slits or weakened portions 10 extend along the central axis A of the tension indication device 1, from a ridge of the circumferential wall but may alternatively in other embodiments be omitted or extend in some other pattern.

The circumferential wall is attached to a disc-shaped base portion 11 of the cover member 6, said base portion 11 comprising the central hole.

The base portion 11 thus extends around the bolt and keeps the circumferential wall centered and attached at tensioning of the central rod 3 even if the nut 4 deforms the circumferential portion. This promotes even spread of the indicator substance 7 about the circumference of the tension indication device 1.

As shown in FIGS. 3 and 4, the base portion 11 is attached to the circumferential wall portion 9 at a longitudinal end portion 12 of the circumferential wall with respect to the central axis A of the tension indication device 1. In other embodiments, the base portion 11 may be connected to the opposite longitudinal end portion 12 of the circumferential wall, i.e. closest to the nut 4. In other embodiments, the base portion 11 may be connected to the circumferential wall portion 9 somewhere between the opposing longitudinal end portions, such as in the middle, thus with indicator substance 7 on either one side of the base portion 11 or on both sides of the base portion 11.

For any of the above described embodiments, the indicator substance 7 and the cover member 6 may be differently colored, for example with the indicator substance 7 being green and the cover member 6 being red. In other embodiments, the colors may alternatively be chosen differently.

The indicator substance 7 is made of thermoplastic but may alternatively in other embodiments be made of any other suitable material, such as plasticine or normally non-runny paste.

FIGS. 5-8 show an alternative second embodiment of the tension indication device 1. In this embodiment, the first space 8 is provided in a recess in the support washer 5 for facing the nut 4, instead of in the cover member 6. Also, the cover member 6 is configured to be fitted between the nut 4 and the support washer 5 and to normally cover the first recess such that the indicator substance 7 is not visible before rotation of the nut 4 for tensioning of the central rod 3. The first space 8 is cylindrical and radially inwards open. Since no wall is provided radially inwards, there is no wall which could prevent the nut 4 from being movable into the first space 8. The cover member 6 is a disc-shaped washer provided with the central hole. The outer diameter of the cylindrical first space 8 is configured large enough to allow the nut 4 to move at least partly into the first space 8 upon tensioning of the central rod 3. The outer diameter of the cylindrical first space 8 is 5% larger than two times the maximum radial extent of the nut 4 but could alternatively in other embodiments be slightly smaller or even larger as long as the nut 4 is still movable into the cylindrical first space 8.

The tension indication device 1 may be provided as a stand-alone product for use with existing rock bolts. Alternatively, it may be provided as part of a rock bolt system comprising both the tension indication device 1 and a rock bolt 2 bundled together.

The invention claimed is:

1. A tension indication device for a rock bolt, the rock bolt including a central rod with a trailing portion provided with a nut, the tension indication device comprising:
    a support washer provided with a central hole arranged for receiving the trailing portion of the rock bolt;
    a cover member with a central hole arranged for receiving the trailing portion of the rock bolt; and
    an indicator substance provided in a first space, wherein
    a) the first space is provided in the cover member and wherein the indicator substance is radially outwards surrounded by a circumferential wall portion of the cover member extending about a central axis of the tension indication device, and wherein the circumferential wall portion is configured such that it is deformable by the nut upon tensioning of the central rod upon rotation of the nut such that the nut at least partly enters the first space, or
    b) the first space is provided in a recess in the support washer for facing the nut, wherein the cover member is configured to be fitted between the nut and the support washer and to normally cover the recess such that the indicator substance is not visible before tensioning of the central rod by rotation of the nut, wherein the first space is cylindrical and radially inwardly open, and wherein the first space is in the cover member and the circumferential wall portion includes slits or weakened portions.

2. The tension indication device according to claim 1, wherein the slits or weakened portions extend along the central axis from a ridge of the circumferential wall portion.

3. The tension indication device according to claim 1, wherein the circumferential wall is attached to a disc-shaped base portion of the cover member, said base portion including the central hole.

4. The tension indication device according to claim 3, wherein the base portion is attached to the circumferential wall portion at a longitudinal end portion of the circumferential wall with respect to the central axis.

5. The tension indication device according to claim 1, wherein the first space is provided in the recess in the support washer and the cover member is a disc-shaped washer provided with the central hole.

6. The tension indication device according to claim 1, wherein the indicator substance and the cover member are differently colored.

7. The tension indication device according to claim 1, wherein the indicator substance is made of thermoplastic, plasticine or paste.

8. A rock bolt system comprising:
    a tension indication device according to claim 1; and
    a rock bolt.

9. The rock bolt system according to claim 8, wherein the first space is provided in the recess in the support washer and the outer diameter of the cylindrical first space of the tension indication device is large enough to allow the nut to move at least partly into the first space upon tensioning of the central rod.

10. The rock bolt system according to claim 9, wherein the outer diameter of the cylindrical first space is less than 5% larger than two times the maximum radial extent of the nut.

* * * * *